US005932312A

United States Patent [19]

Steffen

[11] Patent Number: 5,932,312

[45] Date of Patent: Aug. 3, 1999

[54] PROFILED SEAL FOR LARGE GAP WIDTHS

[75] Inventor: Friedhelm Steffen, Weiskirchen, Germany

[73] Assignee: Saar-Gummiwerk GmbH, Wadern-Büschfeld, Germany

[21] Appl. No.: 08/732,286

[22] PCT Filed: Feb. 13, 1996

[86] PCT No.: PCT/DE96/00239

§ 371 Date: Oct. 28, 1996

§ 102(e) Date: Oct. 28, 1996

[87] PCT Pub. No.: WO96/26345

PCT Pub. Date: Aug. 29, 1996

[30] Foreign Application Priority Data

Feb. 23, 1995 [DE] Germany ........................... 195 06 246

[51] Int. Cl.$^{6}$ ................................ B32B 3/04; E06B 7/16

[52] U.S. Cl. ......................... 428/122; 428/217; 49/475.1

[58] Field of Search .................................... 428/192, 212, 428/156, 217, 122; 52/403.1, 235, 204.71; 49/489.1, 480.1, 475.1

[56] References Cited

U.S. PATENT DOCUMENTS 3,177,534 4/1965 Millhouse et al. .......................... 20/69

4,537,002 8/1985 Ellingson ................................. 52/403

FOREIGN PATENT DOCUMENTS 0291017 11/1988 European Pat. Off. .

0570269 11/1993 European Pat. Off. .

0570269 AL 11/1993 European Pat. Off. .

*Primary Examiner*—Donald Loney

*Attorney, Agent, or Firm*—James Creighton Wray; Meera P. Narasimhan

[57] ABSTRACT

The invention relates to a sealing profile 1 for plastic, metal, and even wooden windows that is able to cover large gaps because the sealing lip 13 and the sealing gap 12 are of a specific form and occupy a specific position. Also, it is able to do this by the fact that they are comprised of different soft and hard plastic materials. The sealing lip 13 and the sealing pad 12 are arranged at a V-shaped incline in relation to one another, with the boundary surface 14 between the softer material of the sealing pad 12. The harder material of the sealing lip 13 then extends very close to the sealing lip 13 on one side and to the anchoring wedge on the other. In addition to the security of being able to span large gaps without problems, the sealing profile 1 also provides the advantage of being able to be completely mounted in corners without difficulty. It also ensures that a secure seal is created since the sealing pad 12 and the sealing lip 13 become properly molded when installed against the glass pane 2.

12 Claims, 5 Drawing Sheets

PROFILED SEAL FOR LARGE GAP WIDTHS

BACKGROUND OF THE INVENTION

The invention relates to a sealing profile made of an elastic material to be used in sealing glass panes to profiles of windows, doors, facades, and similar closures, particularly on the side facing weathering. The invention comprises of: a profile base and a molded-anchoring wedge made of a traditional, elastic-sealing material; an inner-sealing zone in the form of a sealing lip that is positioned on the side opposite the anchoring wedge which is made of the same material; and an outer-sealing zone in the form of a sealing pad that extends from the profile base, separately from the sealing lip, and is made of an elastomeric or thermoplastic material.

In this well-known sealing profile, known in the art due to EP-PS 0 247 533, the sealing pad and the sealing lip are positioned separately from one another on a profile base so that the profile base and the anchoring wedge serve to support the two sealing components. Under the pressure of the glass pane, the sealing lip is bent inward toward the center line of the anchoring wedge. The sealing lip is slightly concave in design to allow a tighter seal when pressure is applied to the glass. Both sealing elements, the sealing pad and sealing lip, act independently of one another; that is, they are correspondingly shifted or reshaped by the glass pane pressed against them. This ensures the necessary tightness. The primary advantage of the sealing profile described here is that the elastomeric or thermoplastic material of the sealing pad makes it possible to completely install the sealing profile without creating creases in the critical-corner area. A similar sealing profile is known through EP-A-0 575 937, where the two sealing elements positioned across from the anchoring wedge on the profile base are pushed to one side. The surmised advantage here is that the proper notches, which are necessary for the installation of the seal at T- or cross-joints, are easier to place, especially when it comes to aluminum windows. Unfortunately, both seals that are known in the art only provide a seal with a 2-mm. maximum coverage space. Without more space, clean corners cannot be formed. This makes it necessary to turn to traditional techniques in which prevulcanized corner pieces or bonded mitre joints are used.

Therefore, it is the object of the invention to create a sealing profile that can be used universally, that creates a secure and even seal, and that can cover gaps of 4 mm. or more.

SUMMARY OF THE INVENTION

The above-mentioned object of the invention is attained because the sealing lip is positioned at an angle from the sealing pad. This way, the boundary between the softer material of the sealing pad and the harder material of the sealing lip is designed to extend into the foot area of the sealing lip, thereby preserving the foot of the anchoring wedge.

The foot zone of the anchoring wedge maintains its original material hardness in order to provide sufficient rigidity and, thus, to ensure a proper overall positioning of the sealing profile. Under the pressure of the glass pane, the special design of the two sealing elements (the sealing lip and the sealing pad) causes the harder material of the sealing lip's foot zone to be pivoted into the softer material of the expanded pad zone. The sealing lip is provided great elastic support, which is practically reversible, for any possible contorting. Thus, the profile seal is highly compressed.

Thereby, it is given the ability to span gaps of up to 4 mm. and more. In this manner, traditional glazing techniques can be applied without any problems, even when large gaps are present as a result of errors in structural dimensions or errors in calculations. The ability to span larger gaps also makes it possible to greatly adjust the material thicknesses to the requirements of the framework construction. The improvement of K-value in accordance with insulation regulations can be achieved not only by installing the glass properly, but it can also be achieved through improved heat insulation via increased sealing compound or broader seals.

One practical embodiment of the invention provides for the sealing positioned at a V-shaped inclination in relation to the center line of the anchoring wedge. As was specified above, this design causes practically equal pressure to be exerted on the sealing pad and sealing lip by the pane of glass, so that both are correspondingly deformed and can span the existing gaps. Another advantage of this embodiment is that the V-shape contributes to an even distribution of the mass of the sealing pad, resulting in improved thermal protection.

A further practical embodiment of the invention is one in which the sealing lip, the profile base, and the anchoring wedge are made of a material having a Shore hardness of approximately 60°. The expanded sealing pad is made of a material having a Shore hardness of approximately 30°. With the proper distribution of the material, the results are as follows. On the one hand, the sealing lip, the profile base, and the anchoring wedge exhibit the required hardness; on the other hand, a sealing pad is created for which the seal is guaranteed to be even due to the reshaping or movement of the sealing lip or the movement of the remaining parts of the sealing profile. As indicated above, the movement serves to fill in the gaps, facilitating an even insertion into corners and T-joints.

The mutual effect of the sealing pad and the sealing lip upon one another in the critical area of the V-shaped angle is best ensured when the area where the sealing pad extends to the sealing lip is curved and properly covers the profile base. Based upon the above-mentioned function of the sealing profile, particularly in the case of plastic and metal window profiles, the foot or the foot zone of the anchoring wedge can remain open or the harder material can be inserted there.

One particularly advantageous adjustment of the sealing pad via pressure from the glass pane is achieved when the sealing pad contains, on the framework side, a notch which gives the entire sealing pad the shape of a cock's head. In this case, the sealing pad can also be correspondingly reshaped, either in its upper region or in the surface to be applied to the glass. This allows for the desired placement on the glass pane.

The effect of the sealing lip, initiated via the pressure applied to the glass pane and the pressure of the pane on the sealing pad, is particularly optimal when the sealing lip is equipped at its open end with a support piece that extends at nearly right angles in the direction of the glass pane or the sealing pad. Additionally, the support piece may be in the shape of a hammer if required in order to sway the reshaping path.

This sealing profile can be used to improve thermal insulation if the profile component contains a strip located below the sealing lip and extending far beyond the lip itself. This strip can be used to completely cover the metal surface of the frame, contributing to improved thermal insulation. If for any reason this strip is not required, it may be removed.

Currently, wooden windows are usually glazed wet. This requires the use of costly silicon, plastics, or even putty. In order for the use of the sealing profile specified in the invention to be used in such applications, the invention provides for the anchoring wedge to be designed in two pieces. One partial wedge is molded on the end of the strip, and a second partial wedge is molded on the opposite end of the profile base that holds the sealing pad. Thus, with this specially designed sealing profile, the wooden frame can be securely framed and sealed with only one additional groove, or simply a deepened groove being made into the wooden panels of the window into which the corresponding partial wedge on the end of the strip is pressed. The sealing wedge on the opposite end advantageously rests against and around the framework; with the subsequent reshaping, sealing lip, and sealing pad, a proper seal is created by the corresponding adjustment or reshaping.

In a further development of the sealing profile designed to be used with wooden windows, the underside of the profile base is equipped with a layer of cement. This can be used in addition to or even with the elimination of the partial wedge positioned on the strip. This creates the possibility of updating already-installed wooden windows. These are windows that could, of course, be fitted with a groove only at a great cost. With the layer of cement, the need for the groove for the partial wedge that is molded on the strip can be eliminated. Naturally, the layer of cement could also remain; however, this is only if the second partial wedge on the end is to be used.

In order to protect the sealing pad and to ensure the uniform reshaping of all sealing elements under the pressure of the glass pane, the design of the second partial wedge is such that it juts out toward the underside of the profile base. Then, retaining and covering a hollow component under the sealing pad, it extends up to the surface that is to be applied to the glass pane. The shaping that occurs when the glass pane is pressed against the sealing lip and sealing pad, ensures proper mounting of the sealing profile on the framework.

In the case of modern-housing construction, the tinting of windows can be an important design element. To maintain the advantageous seals and to achieve an overall favorable appearance, the invention provides for the sealing pad to have a decorative coating that covers the groove surface covering the pane of glass, the sealing lip, and if necessary anywhere beyond that point. As mentioned above, the seal is coated for aesthetic purposes. Therefore, the coating can be limited to surfaces that are visible through the glass. The decorative coating will not produce any negative effects on the sealing pad or on the entire sealing profile itself, particularly if the decorative coating is comprised of a vulcanized, non-cellular, and UV-resistant film. The film or coating is thinly vulcanized (EPDM), and it may be either colored or transparent. What is important is that non-cellular and UV-resistant compositions be maintained.

The invention is specifically characterized in that a type of sealing profile is created that can securely span even larger gaps; thus, it can be beneficially applied yet remain independent of present conditions. The soft material of the sealing pad is no longer limited to the area near the foot or the foot area of the sealing lip. The foot of the anchoring wedge remains in a relatively large space and in maintains its original material hardness that guarantees the necessary rigidity to be present. The pressure of the pane of glass causes the harder material of the sealing lip to be pressed into the softer material of the expanded pad zone so that a correspondingly flexible support is created. A favorable contortion of the softer material of the sealing pad, such as microcellular rubber, is achieved. The sealing pad and the sealing profile are particularly apt for corners. They are also well-suited for T-joints and other joints without causing gaps in the sealing pad.

Further details and advantages of the object of the invention are provided in the following description of the attached diagrams. Here, a preferred embodiment of the invention, along with the necessary details and specific components, is illustrated. These depict:

BRIEF DESCRIPTION OF THE INVENTION

FIG. 1: a sealing profile that has been installed in a window frame;

FIG. 2: a sealing profile having a particularly pronounced sealing pad;

FIG. 3: a sealing pad with a recess;

FIG. 4: a sealing profile with an extended profile base on one side and a decorative coating on the other side;

FIG. 5: a sealing profile for wooden window frames; and

FIG. 6: a sealing profile intended specifically for the updating of wooden window frames.

DETAILED DESCRIPTION OF THE PREFERRED EMBODIMENT

Figure 1:
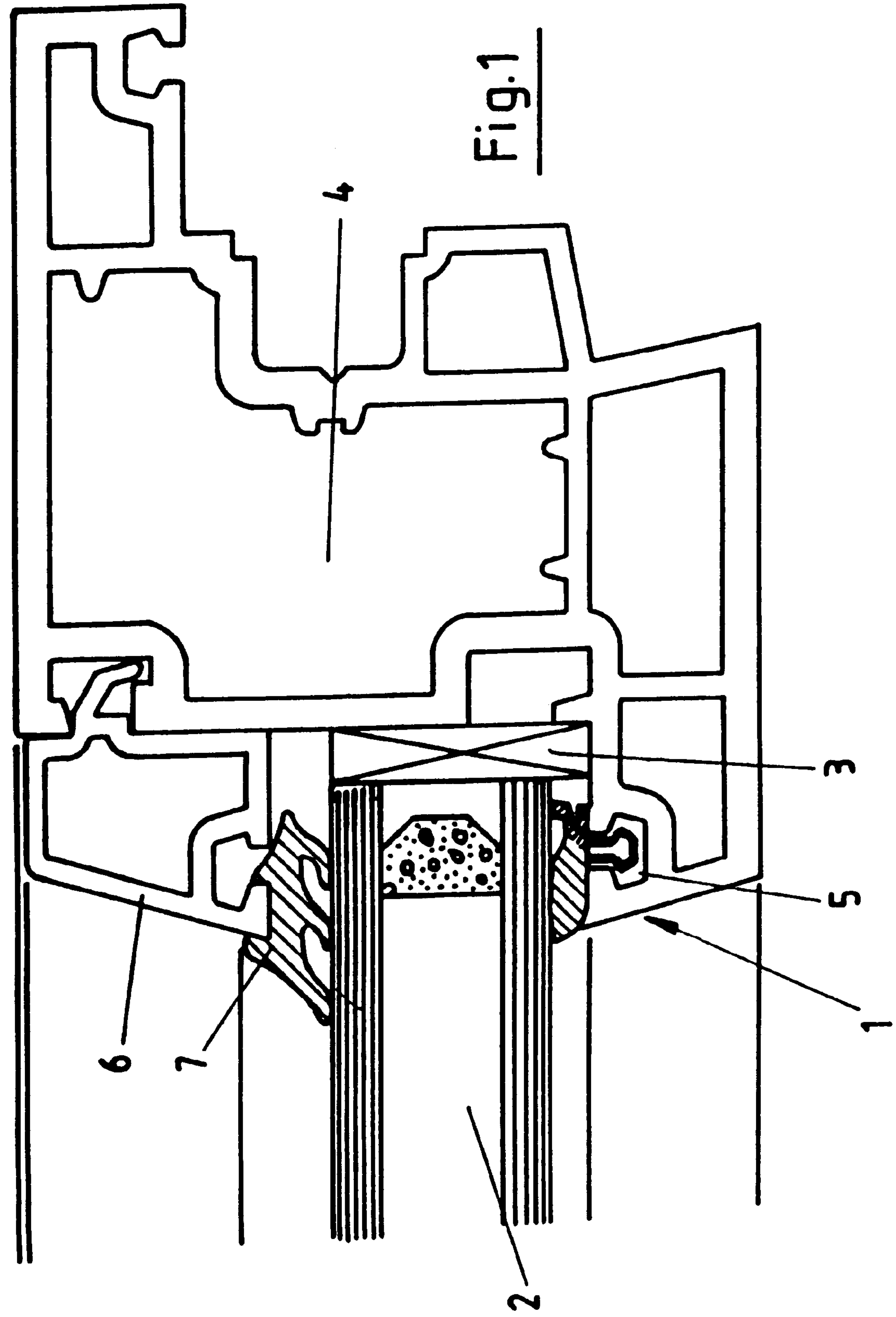

The sealing profile 1 illustrated in FIG. 1 is installed in order to hold the pane of glass 2 together with the pane block 3 between the glass rail 6 and the window frame profile 4. The glass seal 7 serves to seal the inner side, while the sealing profile 1 seals the side facing weathering. The sealing profile 11 [sic] is mounted into a groove 5 located in the window frame profile 4. The illustration in FIG. 1 represents one typical embodiment.

Figure 2:
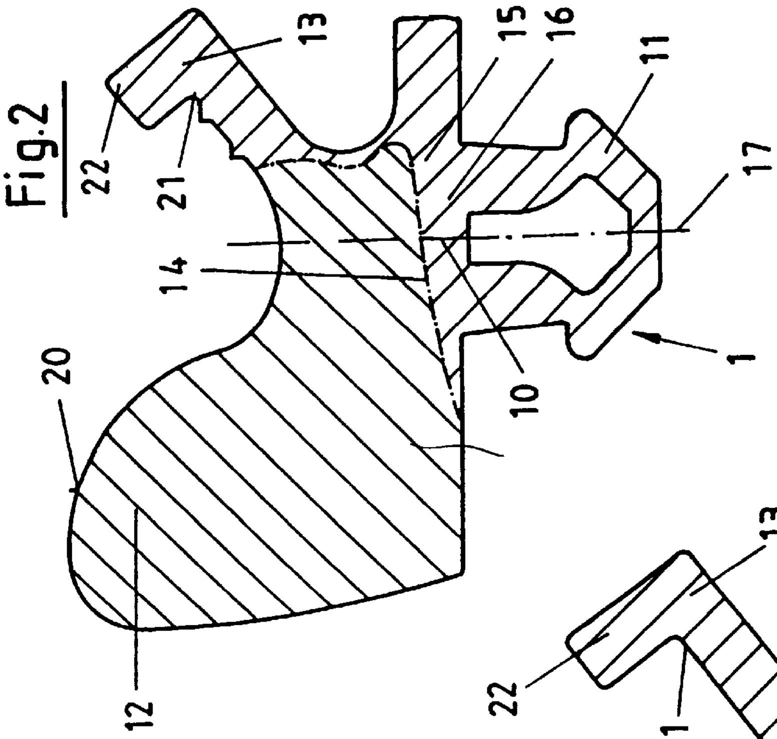
Figure 3:
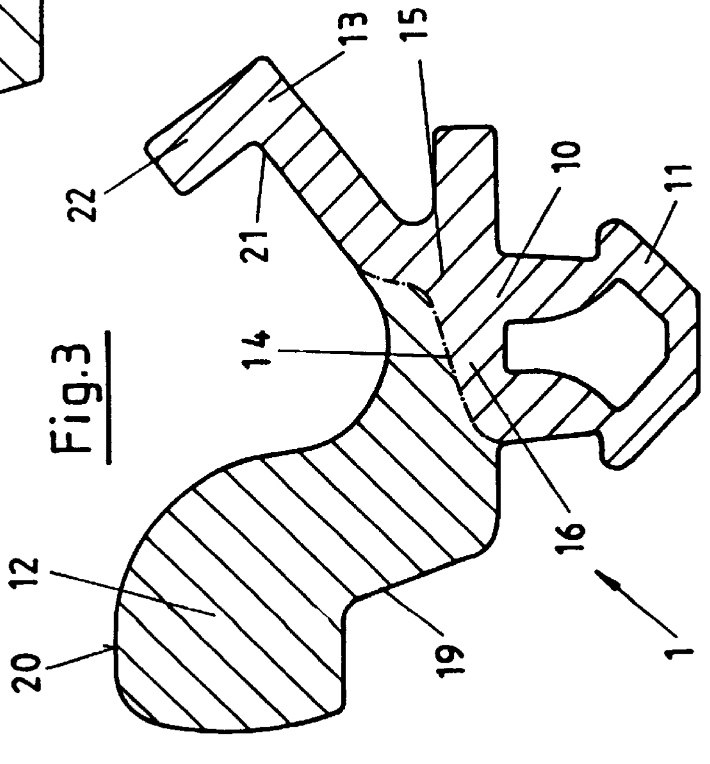

The sealing profile 1 in both FIG. 2 and FIG. 3 is comprised of the profile base 10 and the anchoring wedge 11, which is positioned on the underside. The anchoring wedge 11 is designed to fit into the groove 5 and is intended to ensure that the sealing profile 1 is properly mounted.

On the side of the profile base 10 opposite the anchoring wedge 11 are a sealing pad 12 and a sealing lip 13, both of which lie up against the glass pane 2 to be sealed. The sealing pad 12 is comprised of a closed-cell, embossed material that is based upon elastomers or thermoplasts, such as microcellular rubber. It has a pad that is relatively large in its dimensions. The sealing pad 12 is made of softer material, having a Shore hardness of approximately 30°. The remaining parts of the sealing profile 1 are made of a traditional elastic material, having a Shore hardness of approximately 60°. These remaining parts of the sealing profile 1 are comprised of the profile base 10, the anchoring wedge 11, and the sealing 13.

FIGS. 2 and 3 illustrate that the boundary area 14 between the sealing pad 12 and the sealing lip 13, or the other portions of the sealing profile 1, extends to where the material such as microcellular rubber is drawn close to the sealing lip. This is clearly illustrated in FIG. 2. Here, the layout of the boundary area 14 has a sufficiently large base zone 15 to include the sealing lip. It also has a sufficiently large foot 16 for the anchoring wedge 11 to remain. The foot 16 provides the anchoring wedge with the necessary stability after it has been installed in the groove 15 [sic]. The mounting or installation of the glass pane 2 creates a very flexible support which allows for a reshaping path to be formed. During this, the foot zone 15 of the sealing lip provides the sealing lip 13 with the possibility of pivoting into the softer material of the expanded pad zone or sealing pad 12. The primary advantage of this is the ability to cover large gaps, which cannot be achieved using state-of-the-art sealing profiles. In addition, the sealing profile 1 can be advantageously pressed into the corners without forming creases or similar irregularities. Thus, the formation of a clean corner is guaranteed. With the illustrations seen in FIGS. 1 and 2, one can see that by practical selection of the position of the boundary area 14 between different materials and the selection of the position of the sealing pad 12 and the sealing lip 13, in relation to one another, gap widths of more that 4 mm. can be spanned without difficulty. Still, the sealing profile 1 can still be installed even in the corner areas.

Figure 5:
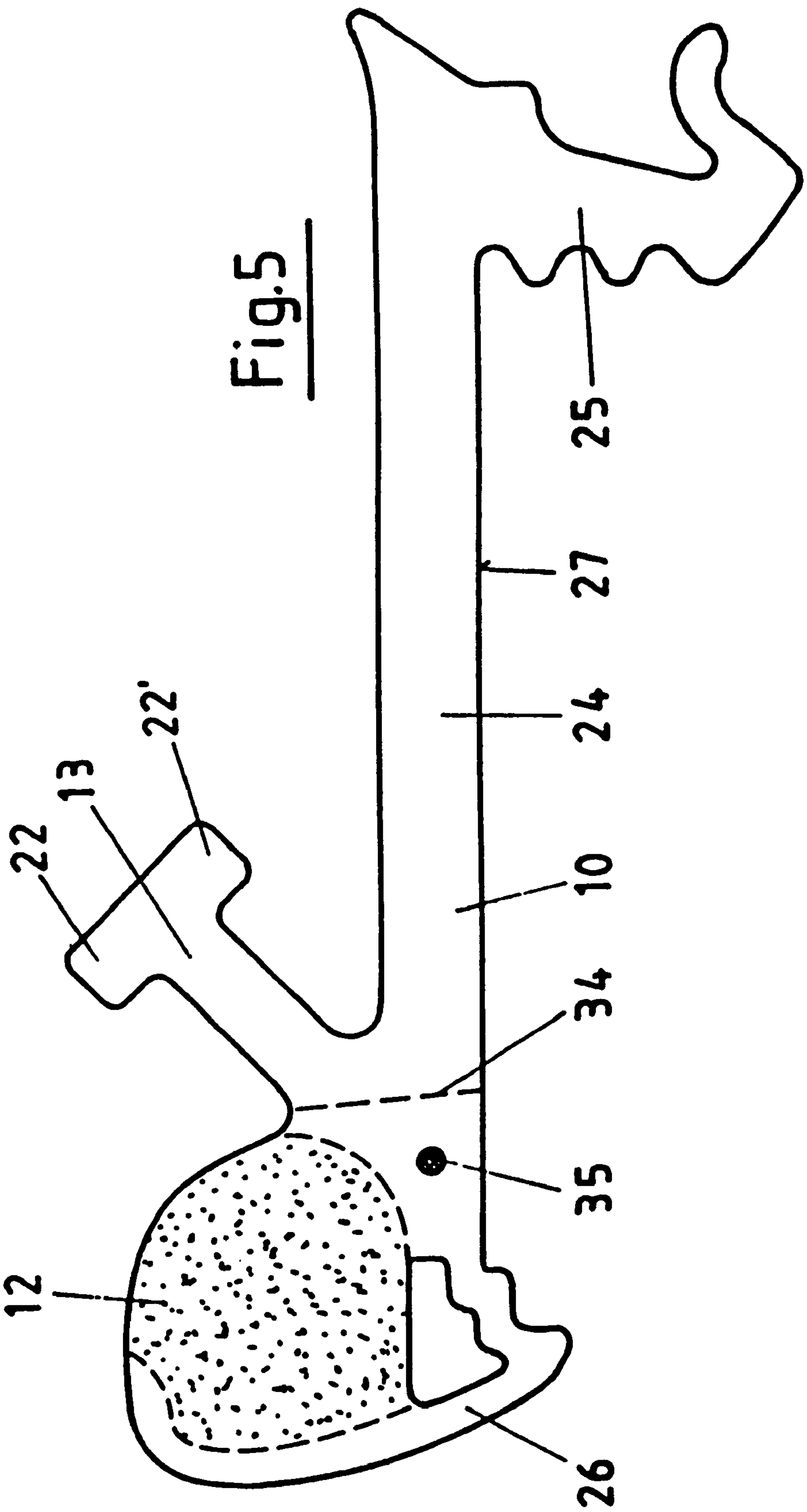
Figure 6:
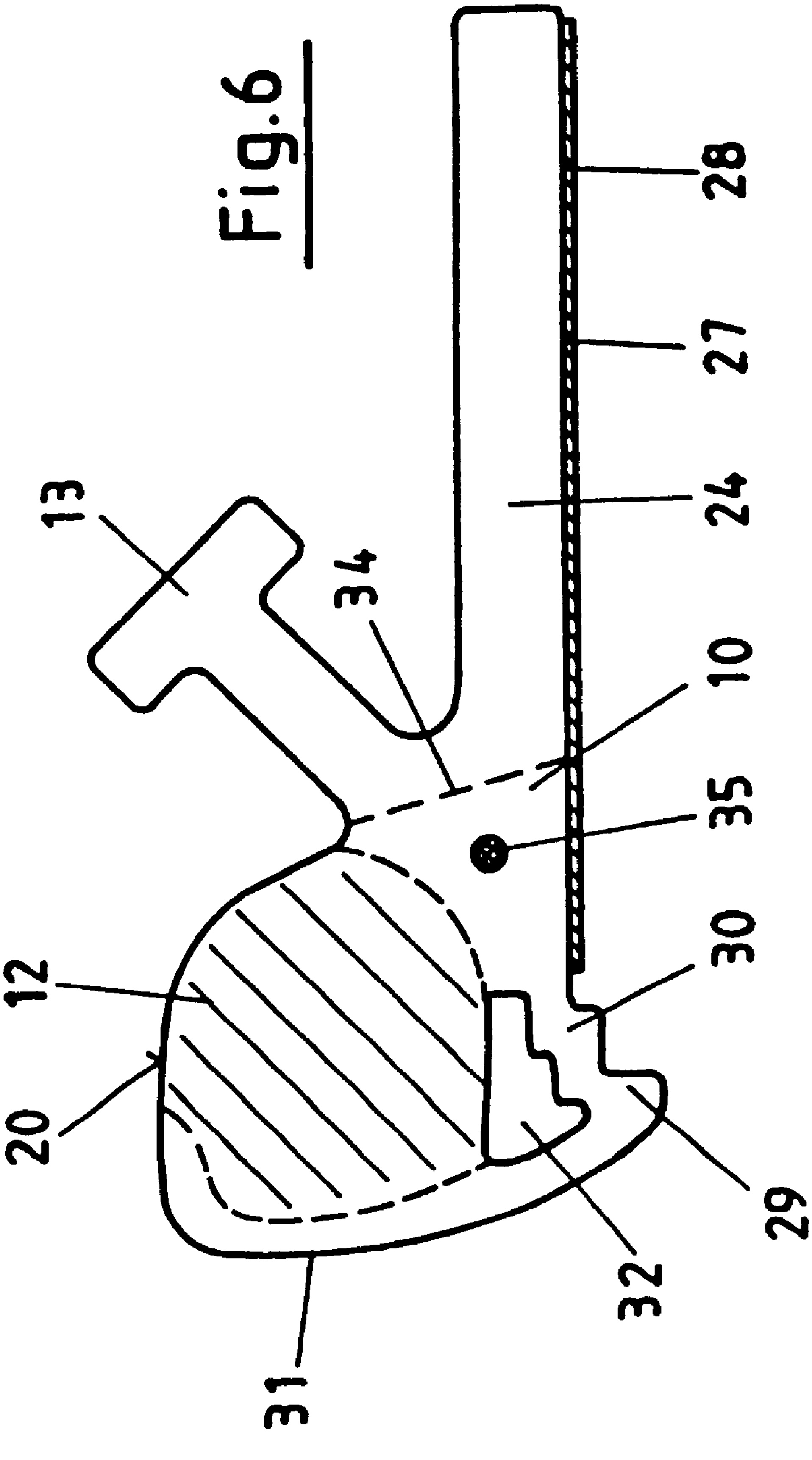

FIGS. 2 and 3 illustrate that the sealing pad 12 and the sealing lip 13 are designed to be positioned in a V-shaped incline in relation to the center line 17 of the anchoring wedge 11. With this feature, the reshaping initiated with the installation of the glass pane 2 specified above can be particularly well effected. Furthermore, the recess 19 in the sealing pad 12 promotes a particularly favorable installation of the glass pane 2 and the profile surface 20. The proper reshaping or adjustment of the sealing profile 1 is further facilitated by the special design of the sealing lip 13, which comprises a reinforcement piece 22 positioned at the open end 21 of the sealing lip and at a right angle to the glass pane 2. In FIGS. 5 and 6 an example is illustrated where this reinforcement piece 22, 22' juts out at both sides over the sealing lip 13. In this manner, the range of motion of the sealing lip 13 can be precisely affected.

Figure 4:
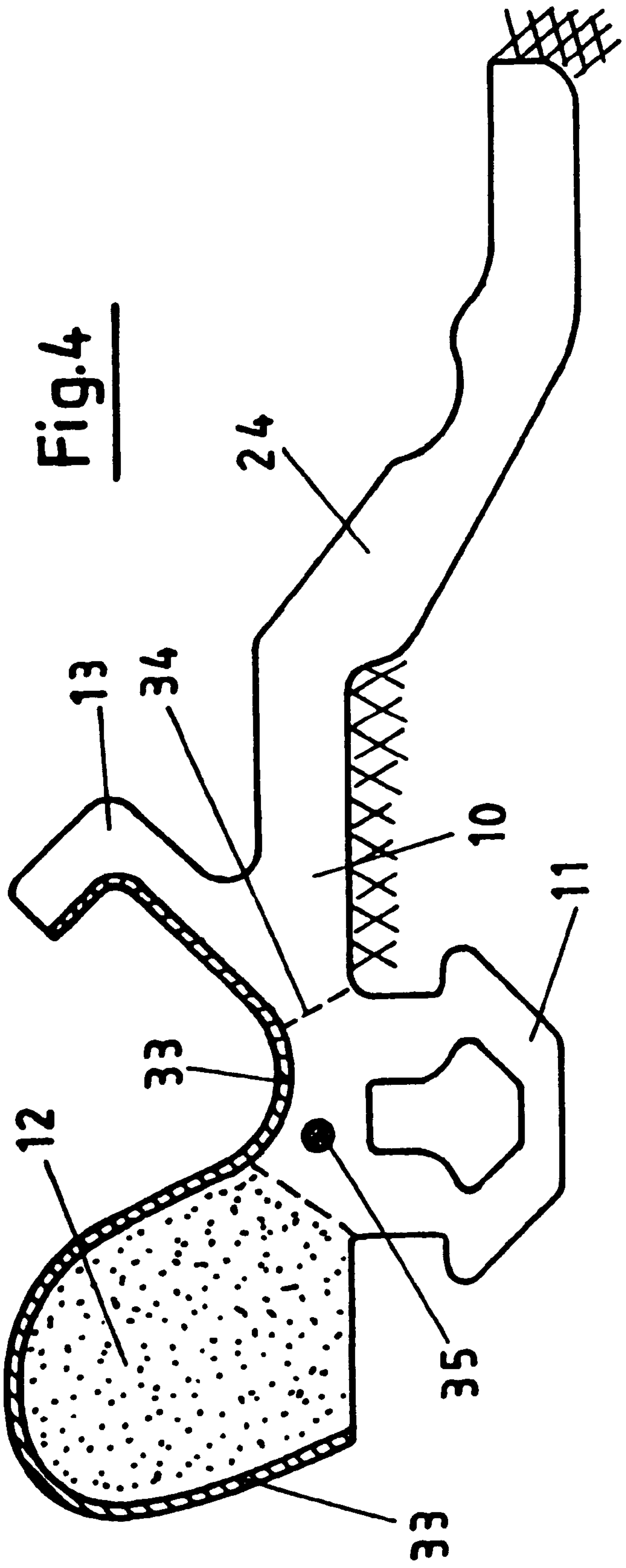

The sealing profile illustrated in FIG. 4 is basically similar to the seal illustrated in FIGS. 2 and 3. In this example, however, the profile base 10 is designed to have a particularly large overhang. This strip 24 on the profile base 10 serves as a sealing lip. This sealing lip is installed on the frame as a covering. Concurrently, it serves as thermal insulation for metal surfaces, particularly aluminum surfaces. When aluminum is used as the material for the window frame 4 and the glass rail 6, thermal insulation becomes more and more important as this material is a particularly good heat conductor. The prevention of hyperextension by using vulcanized cording 35 also facilitates the mounting of the sealing profile and prevents any unexpected tearing away or separation.

While the sealing profile 1 illustrated in FIG. 4 is designed to contain a traditional anchoring wedge 11 on the underside 27 of the profile base 10, FIGS. 5 and 6 illustrate special designs in which the traditional single-piece anchoring wedge is not used. The reason for this is that the profiles illustrated here are to be used in the dry glazing of wooden windows. Even though such wooden windows are currently being glazed with silicon, plastic, or putty, the special designs in FIGS. 5 and 6 make it possible to apply a glazing technique ordinarily reserved for plastic and metal windows.

The partial wedges 25 and 26 located on the underside 27, which in reality are molded on both ends of the profile base 10, ensure a proper mounting process on the wooden profile. The wooden profile is equipped with only one additional groove, or simply a deepened groove, in which the partial wedge is held in place. In all other respects, the window is treated the same as metal and plastic frames.

While the partial wedge 25 enables mounting in the groove (not illustrated here), the opposite partial wedge 26 is designed to have steps 29 and 30, which create a secure, snug fit against the wooden frame. Mounting, and thus also the formation of the seal, are facilitated even further by the fact that in the installation of the glass pane 2, the partial wedge, as a whole unit, is shifted in the direction of the wooden frame (not pictured here). The extension, indicated with number 31, over the softer material of the sealing pad 12 promotes this movement. It also promotes movement of the hollow component 32 in the forward area or in the area of steps 29 and 30.

As a rule, the refitting of already-installed wooden windows using sealing profiles of this type 1 is made more difficult because the new grooves cannot be created in the installed window. In order to make this step unnecessary, there is a layer of cement 28 in FIG. 6 on the underside 27 of the profile base 10. This makes the partial wedge 25 unnecessary.

In FIGS. 4, 5, and 6 number 34 is used to designate a notch that is intended to facilitate mounting of the seal in the corners. This notch can be indicated by a lighter zone or simply by a marking of some kind in order to facilitate the positioning of notch 34. The notch is located in the harder material.

FIG. 4 illustrates another characteristic, a decorative coating 33. This decorative coating 33 extends over broad sections of the sealing pad 12, up to the edge of the sealing lip 13, and if necessary even further. This decorative coating 33 is applied for decorative purposes only; thus, it remains limited to surfaces that are visible through the glass pane 2.

All above-mentioned characteristics, including those mentioned only in the diagrams, are considered essential to the invention, both alone and together.

I claim:

1. Sealing profile (1) made of elastic material and intended for use in sealing glass panes (2) to the profiles (4) of windows, doors, facades, on the side facing weathering, comprising a profile base (10) and a molded anchoring wedge (11) made of elastic sealing material; an inner sealing zone in the form of a sealing lip (13), made of the same material and located on the side opposite the anchoring wedge (11); and an outer sealing zone in the former of a sealing pad (12), made of elastomeric or thermoplastic material and located a slight distance from the sealing lip and projecting out from the profile base (10); characterized in that, the sealing lip (13) is positioned at an angle from the sealing pad (12), a boundary area (14) between a softer material of the sealing pad (12) and a harder material of the sealing lip (13) is designed to extend into a foot zone (15) of the sealing lip (13) in order to retain a foot (16) of the anchoring wedge (11).

2. Sealing profile in accordance with claim 1, characterized in that, the sealing pad (12) and the sealing lip (13) are positioned in a V-shaped incline in relation to the center line (17) of the anchoring wedge (11).

3. Sealing profile in accordance with claim 1, characterized in that, the sealing lip (13), the profile base (10), and the anchoring wedge (11) are made of a material having a Shore hardness of approximately 60°, while the expanded sealing pad (12) is made of a material having a Shore hardness of approximately 30°.

4. Sealing profile in accordance with claim 1, characterized in that, the sealing pad (12) extends up to the sealing lip (13) in a curved shape that correspondingly covers the profile base (10).

5. Sealing profile in accordance with claim 1, characterized in that, the sealing pad (12) contains, on its frame side, a recess which gives the entire pad the shape of a bird's head.

6. Sealing profile in accordance with claim 1 characterized in that, the sealing lip (13) is equipped with a support piece (22), positioned at its open end (21) and projecting at nearly a right angle in the direction of the glass pane (2) or the sealing pad (12).

7. Sealing profile in accordance with claim 1, characterized in that, the profile base (10) is equipped, below the sealing lip (13) with a strip (24) that extends far beyond the sealing lip.

8. Sealing profile in accordance with claim 1, characterized in that, the anchoring wedge (11) is designed to be in two pieces, wherein one partial wedge (25) is molded onto the end side of a strip (24), and a second partial wedge (26) is molded onto the opposite end of the profile base (10) which supports the sealing pad (12).

9. Sealing profile in accordance with claim 8, characterized in that, in addition to or with the elimination of the partial wedge (25) positioned on the strip (24), the underside (27) of the profile base (10) is fitted with a layer of cement (28).

10. Sealing profile in accordance with claim 7, characterized in that a second partial wedge (26) is designed to jut out in gradations from the underside (27) of the profile base (10), it then extends, retaining a hollow component (32), under the sealing pad (12) and up around the pad, as well as up to the surface (20) of the seal and the glass pane (2).

11. Sealing profile in accordance with claim 1, characterized in that, the sealing pad (12) has a decorative coating (33) that covers the seal surface (20) on the glass pane (2), extending up to the sealing lip (13), and beyond.

12. Sealing profile in accordance with claim 11, characterized in that, the decorative coating (33) is comprised of a vulcanized, non-cellular, and UV-resistant film.

* * * * *